US009800557B2

(12) United States Patent
Maier et al.

(10) Patent No.: US 9,800,557 B2
(45) Date of Patent: Oct. 24, 2017

(54) PROCESSING OF RESTRICTED DATA

(71) Applicant: International Business Machines Corporation, Armonk, NY (US)

(72) Inventors: Albert Maier, Tuebingen (DE); Volker Seemann, Potsdam (DE); Johannes Schuetzner, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

(21) Appl. No.: 14/636,585

(22) Filed: Mar. 3, 2015

(65) Prior Publication Data
US 2015/0256520 A1 Sep. 10, 2015

(30) Foreign Application Priority Data
Mar. 4, 2014 (GB) .................................. 1403742.8

(51) Int. Cl.
*G06F 21/00* (2013.01)
*H04L 29/06* (2006.01)
(Continued)

(52) U.S. Cl.
CPC .......... *H04L 63/0428* (2013.01); *G06F 21/00* (2013.01); *H04L 67/1004* (2013.01)

(58) Field of Classification Search
CPC ............. H04L 63/0428; H04L 67/1002; G06F 17/30864
See application file for complete search history.

(56) References Cited

U.S. PATENT DOCUMENTS 8,127,133 B2 2/2012 Cross et al.
2003/0037237 A1* 2/2003 Abgrall ................... G06F 21/53
713/166
(Continued)

FOREIGN PATENT DOCUMENTS

GB 2430591 A 3/2007
WO WO2013113607 A1 8/2013
WO WO 2015084689 A1 * 6/2015 ............. G06F 21/60

OTHER PUBLICATIONS

Muhammad I. Sarfraz, Mohamed Nabeel, Jianneng Cao, Elisa Bertino; "DBMask: Fine-Grained Access Control on Encrypted Relational Databases"; Mar. 2015; CODASPY '15: Proceedings of the 5th ACM Conference on Data and Application Security and Privacy; Publisher: ACM; pp. 1-11.*
(Continued)

*Primary Examiner* — Fatoumata Traore
*Assistant Examiner* — Courtney Fields
(74) *Attorney, Agent, or Firm* — Cantor Colburn LLP

(57) ABSTRACT

Embodiments relate to operating a data processing system. An aspect includes receiving a request for data storage by an application server, said request comprising restricted-access data. Another aspect includes processing the request in the first application server thereby extracting said restricted-access data from the request. Another aspect includes encrypting said restricted-access data with a cryptographic key associated with said privacy regime to a cipher representation. Another aspect includes defining a masking rule relative to the field designated for storage of the cipher representation, the masking rule defining a set of privacy regimes applicable to processing of the restricted-access data. Another aspect includes forwarding the cipher representation and the masking rule to the shared database by a database client. Another aspect includes maintaining information about the cryptographic key in said database client
(Continued)

for allowing plaintext reconstruction of restricted-access data from the cipher representation when retrieved from the shared database.

20 Claims, 4 Drawing Sheets

(51) Int. Cl.
 *G06F 21/60* (2013.01)
 *G06F 21/62* (2013.01)
 *H04L 29/08* (2006.01)

(56) References Cited

U.S. PATENT DOCUMENTS

| | | |
|---|---|---|
| 2006/0050870 A1 | 3/2006 | Kimmel et al. |
| 2008/0140620 A1 | 6/2008 | Bender |
| 2011/0191862 A1 | 8/2011 | Mandava et al. |
| 2011/0321120 A1* | 12/2011 | Saxena .............. G06F 21/6245 726/1 |
| 2013/0047230 A1* | 2/2013 | Krishnan .............. H04L 63/102 726/7 |

OTHER PUBLICATIONS

"IBM Websphere, Administration Guide for Federated Systems, Version 9", Jan. 1, 2006; retrieved from the Internet: url: ftp://ftp.software.ibm.com/ps/products/db2/info/vr9/pdf/letter/en_US/iiyfpe90.pd; pp. 1-362.

A. Maier, et al., "Processing of Restricted Access Data," Related U.S. Appl. No. 13/750,547, filed Jan. 25, 2013.

Bhatti, et al., "Federated Access Control in Distributed Data Warehousing Applications", IP.Com, IPCOM000176162D, Nov. 6, 2008, 13 pages.

International Application No. GB1403742.8, Filed Mar. 4, 2014; Applicant's Reference No. DE9-2013-0144; International Search Report dated Aug. 19, 2014; pp. 1-3.

International Application No. PCT/EP2013/051310; Applicant's Reference No. DE920110121; International Peliminary Report on Patentability and Written Opinion dated Aug. 14, 2014; pp. 1-10.

International Application No. PCT/EP2013/051310; Applicant's Reference No. DE920110121; International Search Report and Written Opinion dated Apr. 15, 2013; 12 pages.

Kastner, et al., "Access Controls for Federated Database Environments—Taxonomy of Design Choices", International Federation for Information Processing, Technical Committees, 1995, 18 pages.

List of IBM Patents or Patent Applications Treated as Related; Mar. 3, 2015; pp. 1-2.

* cited by examiner

PROCESSING OF RESTRICTED DATA

BACKGROUND

The present disclosure relates generally to the field of digital data processing in integrated and centralized software applications, and particularly relates to a method for processing data containing information which is subject to handling and/or access restrictions under legal regulations or organizational policies.

Many countries have data privacy laws forbidding to process and to store persistently a certain kind of data outside the respective country. For example, German data privacy act makes transfer and processing of data containing personal information of a natural person as, for example personal address data, birthday, outside of the European Union/European Economic Area (EU/EEA) region subject to explicit consent of the respective person. This requirement often constitutes a major hurdle for the implementation of a "Globally Integrated Enterprise" (GIE) strategy, characterized by an integration of regional business processes into global processes presupposing that globally distributed data can be processed without any restrictions. Typical Globally Integrated Enterprise strategy includes consolidation of regional business processes and data into global business processes as an important and principal element. Data and process consolidation, however, heavily benefits from consolidation and integration of the underlying information processing infrastructure. Therefore, in practice there is a tendency to deploy single global instances of business applications. As a consequence, several approaches have been developed for making these systems and data processing methods compliant with access, transfer and handling restrictions.

SUMMARY

Embodiments relate to operating a data processing system, said data processing system comprising a plurality of application servers, each application server being individually connected to a shared database by means of a respective database client, said plurality of application servers including a plurality of first application servers, said plurality of first application servers and respective database clients being privileged for processing of restricted-access data under a privacy regime. An aspect includes receiving a request for data storage by one of said plurality of first application servers, said request comprising restricted-access data. Another aspect includes processing the request in said one of the plurality of first application servers thereby extracting said restricted-access data from the request. Another aspect includes encrypting said restricted-access data with a cryptographic key associated with said privacy regime to a cipher representation. Another aspect includes defining a masking rule relative to the field designated for storage of the cipher representation in the shared database, the masking rule defining a set of privacy regimes applicable to processing of the restricted-access data included in said field. Another aspect includes forwarding the cipher representation and the masking rule to the shared database by the database client associated to said one of said plurality of first application servers. Another aspect includes maintaining information about the cryptographic key in said database client for allowing plaintext reconstruction of restricted-access data from the cipher representation when retrieved from the shared database.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

Various embodiments will now be described, by way of example only, with reference to the following drawings in which.

DETAILED DESCRIPTION

Figure 1:
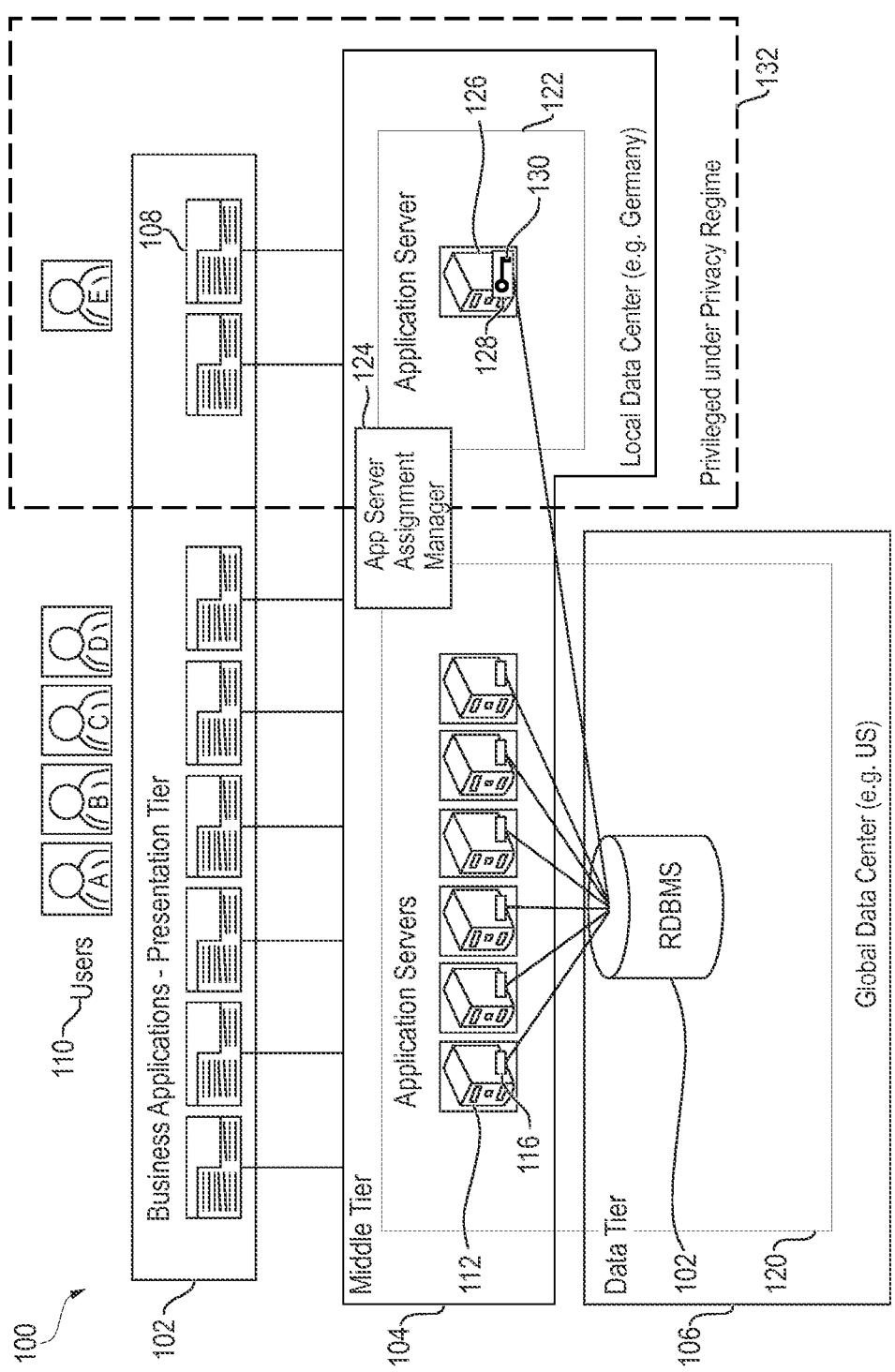
FIG. 1 is a block diagram scheme of an embodiment of a data processing system for processing of restricted-access data.

Embodiments disclosed herein relate to processing of restricted data. As used herein, the term "privacy regime" shall relate to any kind of restrictions relative to processing of data. A typically privacy regime will not apply to data processing per-se but will define an informational quality of data being subject to restrictions. Data being subject to restrictions under a privacy regime due to its informational quality therefore will be referred to as "restricted-access data" in the following. Well-known privacy regimes are the data privacy acts included in many national laws and supra-national regulations which typically apply to personal data of natural persons. Restricted-access data thereunder may be, for example, the name, age, email address, date of birth or local address of a natural person. Most of the privacy acts restrict handling and processing of restricted-access data as, for example storing, to persons and data processing inventory located in a certain geographical area or region. Reciprocally, a piece of hardware located in that area or region may be understood as being privileged under the respective privacy act.

Therefore, in the following and with reference to a data processing system, the term "privileged under a privacy regime" shall generally relate to a component thereof or an application executed by means of a component which is allowed to comprise or to process restricted-access data under that privacy regime. This may include the trivial cases where all components of the data processing are privileged or none of the components is privileged. With reference to a user of a data processing system, the term "privileged under a privacy regime" shall have the meaning that any interaction of the user with the data processing system is limited to components of the data processing system which are privileged under the privacy regime.

A first principal embodiment provides a method for operating a data processing system having multiple application servers, each thereof being individually connected to a shared database by means of database clients, the multiple application servers including a number of first application servers, wherein the first application servers and the respective database clients being privileged for processing of restricted-access data under a privacy regime. The method has operational sections for receiving a request for data storage by one of these first application servers, whereby the request comprises restricted-access data; processing the request in the aforementioned one of the first application servers thereby extracting the restricted-access data from the request; encrypting the restricted-access data with an cryptographic key associated with the privacy regime to a cipher representation; defining a masking rule relative to the field designated for storage of the cipher representation in the shared database, the masking rule defining a set of privacy regimes applicable to processing of the restricted-access data included in the field; forwarding the cipher representation and the masking rule to the shared database by the database client associated to the aforementioned one of the first application servers; and maintaining information about the cryptographic key in the database client for allowing plaintext reconstruction of restricted-access data from the cipher representation when retrieved from the shared database.

In some embodiments, the method for operating a data processing system further may comprise generating the storage request by a user application which is privileged under the privacy regime.

In some embodiments, the method for operating a data processing system further may comprise routing the request from the user application to the one of the first application servers by maintaining the privilege under the privacy regime.

In some embodiments, a method for operating a data processing system may be designed to comply with a privacy regime which limits the processing of the restricted-access data to a geographical area or an organizational unit and assumes the first application servers being privileged for processing of restricted-access data under the privacy regime due to the location of the processing hardware.

In some embodiments, a method for operating a data processing system may be further designed to perform the operations of extracting the piece of restricted-access data from said storage request and/or encrypting the extracted piece of restricted-access data by the database client associated to the one of the first application servers.

In some embodiments, a method for operating a data processing system may be further designed to perform the operation of defining the masking rules by the database client associated to the one of said first application servers.

In some embodiments, a method for operating a data processing system may be further designed to perform encrypting of the restricted-access data being by applying a format preserving encryption scheme.

In some embodiments, a method for operating a data processing system may further comprise operational sections for: receiving by the shared database the cipher representation of the restricted-access data from the database client associated to the one of the first application servers; storing the cipher representation in a field in the shared database; receiving a masking rule associated with the field storing the cipher representation, whereby the masking rule defines a set of privacy regimes being admitted for retrieval of the cipher representation; and in response to a request for retrieval of data from the field in the shared database, returning the cipher representation if the request is privileged under the privacy regime in accordance with the associated masking rule; otherwise, returning a blank value or a default value.

Another principal embodiment provides a method for managing tables and masking rules in a shared database which is configured for storing cipher representations of restricted-access data, the shared database being connected to multiple application servers by means of respective database clients, the multiple application servers including a number of first application servers being privileged for processing of restricted-access data under a first privacy regime and a number of second application servers being excluded from processing of restricted-access data under the privacy regime. This method may comprise operational sections for: receiving, from a database client associated with one of the second application servers, by the shared database a structure conversion request for creating a new table as an excerpt or copy of an existing source table, the excerpt or copy including cipher representations of restricted-access data; and creating a new table thereby performing a copy operation for all field data including fields containing the cipher representations of restricted-access data not being retrievable from the database client under the masking rules.

In some embodiments, a method for managing tables and masking rules in a shared database may be designed to manage a shared database not being privileged under the privacy regime.

Another embodiment provides a computer program product comprising computer executable instructions to perform a method as defined before.

Another embodiment provides a data processing system which comprises a shared database and multiple application servers, each thereof being individually connected to the shared database by means of database clients, the multiple application servers including a number of first application servers being privileged for processing of restricted-access data under a privacy regime, the data processing system being configured for performing a method as defined before.

FIG. 1 is a block diagram schematically showing an embodiment of a data processing system. The data processing system 100 is suitable for handling restricted-access data in compliance with an underlying privacy regime. The data processing system 100 is in commonly known vertical three-tier architecture. Such three-tier architecture as shown in system 100 comprises an uppermost presentation tier 102, a middle tier 104 and a data tier 106. Additionally, the data processing system 100 may be split into local and global portions to reflect the privileges of the respective system components under the privacy regime. In particular, the presentation tier 102 and the middle tier 104 may be split whereas the data tier 106 may be entirely allocated to the non-privileged global section of the data processing system. As a consequence, there may be a section 132 that is privileged under the privacy regime and another non-privileged remainder section in the presentation tier 102 and the middle tier 104. According to a typical implementation target, the predominant portion of the data processing system 100 may belong to the non-privileged section. The underlying reason is that privacy regimes inherently are mutual exclusive rather than cascaded, inclusive or hierarchical and an approach suitable for handling and/or processing data in compliance with one privacy regime typically will not comply with most other privacy regimes.

The presentation tier 102 may comprise business applications as, for example, a user application 108. In the presentation tier 102 users 110 may be enabled to initiate requests for data processing as, for example data storage and retrieval. In response thereto, the results of these requests may be returned to the user application 108 in the presentation tier 102 for further processing, interactive manipulation, display or printout. The presentation tier 102 may be connected to the middle tier 104 by means of a common computer network. Multiple application servers 112, 126 may be provided in the middle tier 104.

A portion of the middle tier 104 and the data tier 106 without privilege under any privacy regime may be referred to as "global data center" 120. The application servers 112 in the global data center shall be referred to as "global application servers" in the following. In the data tier 106 the global data center 120 may also include a shared database 114. By assumption, the global data center 120 shall not be privileged under any privacy regime. As a consequence, the global data center 120 must not provide any means or methods for plaintext access to or retrieval of restricted-access data being subject to application of any such privacy regime. This may be achieved by storing restricted-access data in cipher representation in the shared database 114 thereby maintaining information necessary for decryption in a part of the system 100 which is privileged under the respective privacy regime.

Such privileged part may be found in the local data center 122. The local data center 122 may comprises a single or multiple application servers 126. The single application server 126 in the local data center 122 therefore will be referred to as the "first application server" or the "local application server" in the following. The local data center 122, by assumption, shall be understood as being privileged under at least one privacy regime applicable to the data processing system. Therefore, restricted-access data being subject to application of the respective privacy regime may be handled and processed in plaintext within the local data center 122. In circumstances, there may be provided more than one application server in the local data center 122 and there may be more than one local data center, if necessary. In such situation, the multiple local data centers may be privileged under the same or under different privacy regimes according to the specific overall system requirements.

In an example, it is assumed that only one privacy regime is applicable to the example data processing system 100. In another example, the privacy regime may be the German data privacy act. Then, handling and processing of restricted-access data is limited to a geographic region restricted-access data must neither be stored, neither processed nor transmitted by hardware and/or media outside that geographical region and the privileged section 132 of the data processing system 100 may be determined according to the geographic place of its underlying hardware components and signal transmission media.

All application servers 112, 126 in the middle tier 104 layer may be connected to the shared database 114 in the global data center 120 by means of pairwise associated database clients 116, 128 In instances, the global application servers 112 may be connected to the shared database 302 of the data tier 106 by means of standard database clients as only standard database client functionality may be invoked from the global application servers 112.

In difference, the local application server 126 of the middle tier 104 may be connected to the shared database 114 by means of an extended database client 128. An extended database client 128 basically provides the same functions to the application server associated thereto as known from standard database clients. Beyond this, an extended database client 128 may be configured for providing additional functions in support of system operations for restricted-access data storage and retrieval and for some database structure conversion operations as described before with reference to FIGS. 1 to 3 in detail. In particular an extended database client may be configured for performing encryption, decryption and key management functions. Additionally, an extended database client may be configured for defining masking rules during data storage operations.

An application server assignment manager 124 in the middle tier 104 may be configured for routing the data requests originating from the user applications 108 in the presentation tier 102 to one of the application servers 112, 126 in the middle tier 104.

The application server assignment manager 124 may be configured for routing so-called "global requests" in a conventional manner, as for example under load balancing considerations, to the global application servers 112. Thereby, a user request shall be understood as global request when either originating from a user application being not privileged under any privacy regime or not requiring such privilege even if such privilege is available for the user application where the request originates from. For example, a privilege available for a certain local user application may be effectively not required in a situation when the request originated by the local user application does not involve any restricted-access data. This, for example, may occur when statistical data based on row counts is retrieved by the user application or a similar inventory-count operation is performed.

The application server assignment manager 124 may be additionally configured for routing so-called "local requests" in compliance with the set of privacy regimes applicable to the entire system 100. In particular, such compliance may be achieved by routing requests originating from local user applications and being subject to the privacy regime applicable to the respective user application where the request originates from to a local application server 126 privileged under the same privacy regime. In the example situation of FIG. 4 assuming only one privacy regime such routing clearly would mean to forward the request to the local application server 126 in the local data center 122. This is due to the situation that only the local application server 126 has better privilege under the applicable privacy regime than the application servers 112 in the global data center 122 which may be considered as having void privilege.

When, in more complicated situations, multiple privacy regimes may be covered by multiple local data centers, routing may be performed based on information about the user application the request originates form. In a more detailed situation, when the privacy regime includes geographical use restrictions for restricted-access data, such information may include data describing the geographical location of the user and/or user application. In yet more detailed situations, geographical information may be derived from network location identifiers in the computer data network connection between the presentation tier and the middle tier.

Figure 2:
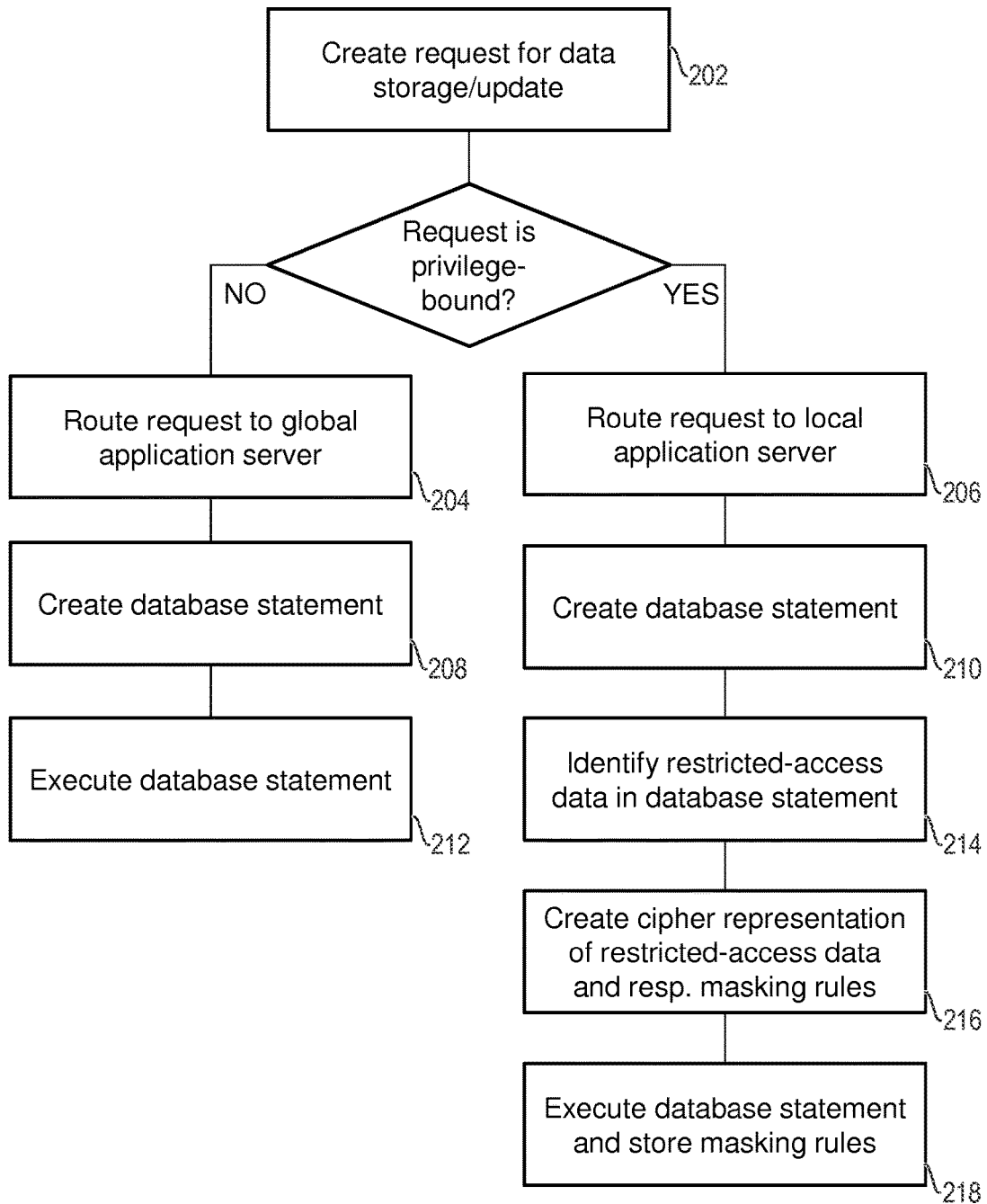
FIG. 2 is a flowchart of an example method for operating the data processing system according to FIG. 1 during storage of data containing restricted-access data.

FIG. 2 schematically illustrates a data storage or update operation involving restricted-access data. The data storage or update operation may be invoked by a request. The request may be issued by a user application 108 that is in a section 132 that is privileged under the privacy regime in a first block202. It should be understood at this point, that the privilege of the user application 108 does not necessarily imply any request originating therefrom to be "privilege-bound". In a typical situation in practice a considerable portion of requests issued from a privileged user application 108 may be processed in an environment without any privilege as restricted-access will not be involved.

In a first example scenario, the request for data update or storage shall be assumed to include restricted-access data as the payload data for the intended storage or update operation in the shared database 114. As long as these restricted-access data can be retrieved or reconstructed from the request or any (intermediate) result of subsequent processing based thereon, the request and/or the (intermediate) result shall be understood as "privilege-bound" in the meaning that it requires the privilege. A privilege-bound intermediate result may be, for example, a database statement which has been derived from the request and comprises at least a portion of the restricted-access data included in the request. In a typical situation, the payload data of a request will propagate into the database statement derived therefrom.

In a subsequent block206 the request may be routed by the application server manager 124 according to the required privilege. In the first example scenario, the application server manager 124 may identify the request to require the privilege of the local data center 122 and may route the request to that local data 122 center directly in a subsequent block206. In addition, the application server manager 124 may perform a kind of load balancing routing within the limitations set by the required privilege at this point. Such load balancing, however, is well-known in practice and therefore will not be explained in detail.

In the next block210 the request may be received and processed by the local application server 126 in the local data center 122. Generally, the application server 126, as well as the global application servers 112, may be understood as being configured for transformation of incoming requests into database statements to be sent to the global database 114 by means of the respective database clients 116, 128.

According to a principal approach, in local data centers the transformation has to be made in a way making the restricted-access data inaccessible in the resulting database statement. This is because the database statement is intended to be transmitted to the shared database 114 located outside the privileged section for execution and therefore must not be privilege-bound. The inaccessibility of restricted-access data in the database statement may be achieved according to the principal approach by replacing the plaintext by a cipher representation and by restricting access to the cryptographic key necessary for plaintext reconstruction to the privileged section 132.

Generally, encryption and/or management of the cryptographic key 130 may be achieved either by suitable configuration of the application server 126 and/or the database client 128 associated thereto. Under practical considerations, the most convenient approach may be to integrate the functionality entirely into the database client 128. This allows the application server(s) 126 in the local data center 122 to be identically configured as the application server(s) 112 in the global data center 120. Identical configuration may help to reduce efforts in software maintenance.

Accordingly, the database client 128 in the local data center 122 may be provided with extended functionality when compared to the database clients 116 in the global data center 120. In particular, the database client 128 in the local data center 122 may be configured to perform a block214 for detecting restricted-access data in database statements received from the associated application server 126 in the preceding block210. This detection may be made implicitly based on the data fields in the shared database 114 to be written or updated. In particular, look-up data relative thereto may be configured and stored in the database client 128 which may be used in a decision whether a specific field in the global database 114 is dedicated to contain restricted-access data under the privacy regime. In the look-up data, the specific field may be identified by a vector containing the name of the table and the name of the column under the assumption that any field in that table column will have the same quality of information. When a certain field data has been detected to contain restricted-access data, the database client 128 may be configured to replace the plaintext of the restricted-access data by a cipher representation thereof. The cipher representation may be generated by encrypting the restricted-access data with an internally stored cryptographic key 130. For the sake of simplification, a symmetric cryptographic scheme may be assumed in the example situation. As a consequence, there will only one cryptographic key to be managed by the database client 128. In another example, an asymmetric encryption scheme could be used as well.

After replacement of all plaintext of restricted-access data by cipher representations the database statement may be considered as being no longer privilege-bound and, consequently, may be sent outside the privileged system section 132 to the shared database 114 for execution. In the shared database 114 the database statement will be executed in a well-known manner in a following block218.

In some embodiments, the database client 128 may be configured to perform a kind of format preserving encryption. Format preserving encryption shall be understood in the meaning that the cipher representation will fit to the same database field as the plaintext representation. Format preserving encryption would at least be advantageous under migration aspects. As another advantage, format preserving encryption would allow the use of different cryptographic schemes or algorithms in different local data centers or different database client software versions. As another advantage, format preserving encryption would allow a table column to contain mixed plaintext and cipher representations.

Additionally, in block216 the database client 128 may create a set of masking rules. These masking rules may be intended to be used in data retrieval operations for avoiding unintended access to cipher representations. This will be explained below with reference to FIGS. 3 and 4 in detail. For the sake thereof, masking rules may be generally understood as markers to fields in the shared database 114 having cipher representations stored.

In the example situation, a masking rule for a database field may be limited to data allowing identification of the respective database field. Such identification of an individual database field may be provided, for example, in the form of a masking vector containing the table name, the column name and the primary key of the row. The masking rule or masking vector may be sent by the database client 128 to the shared database 114 for storage. In instances, the database client 128 may keep local copies of the masking rules for the purpose of speeding up data retrieval operations as will be explained below.

As the example situation has been restricted to a single privacy regime, there is no need to provide any indication towards the privileged section managing the cryptographic key for plaintext reconstruction of the cipher representation. In a more elaborated implementation, however, the masking rules may be extended to contain additional data for this sake. In a more particular implementation, an extended masking rules may contain not only one indicator but an entire set of indicators to privileged system sections managing cryptographic keys suitable for plaintext reconstruction of the cipher representation in the given database field. In this way, a multi-level security scheme may be implemented.

In a second example scenario, the request shall be assumed not to include restricted-access data as the payload data for the storage or update operation in the shared database 114. Then, the request may be routed to any local or global application server 112, 126 in block204 and the method will proceed along the left branch of the flowchart in FIG. 2. Then, there may be made no difference between application servers 112 in the global data center and privileged ones. In principal, the request could be processed in the local data center 122 as well as in the global data center 120. Typical implementations, however, may restrict routing for non-privilege-bound requests to the global application servers 112 in order to keep the local data center 122 clear of unspecific load and data traffic.

Processing of the request includes a block208 for transforming the request into a database statement and a subsequent section 212 for executing the statement in the shared database 114. Both sections may be implemented in conventional manner and will not be explained in detail.

Figure 3:
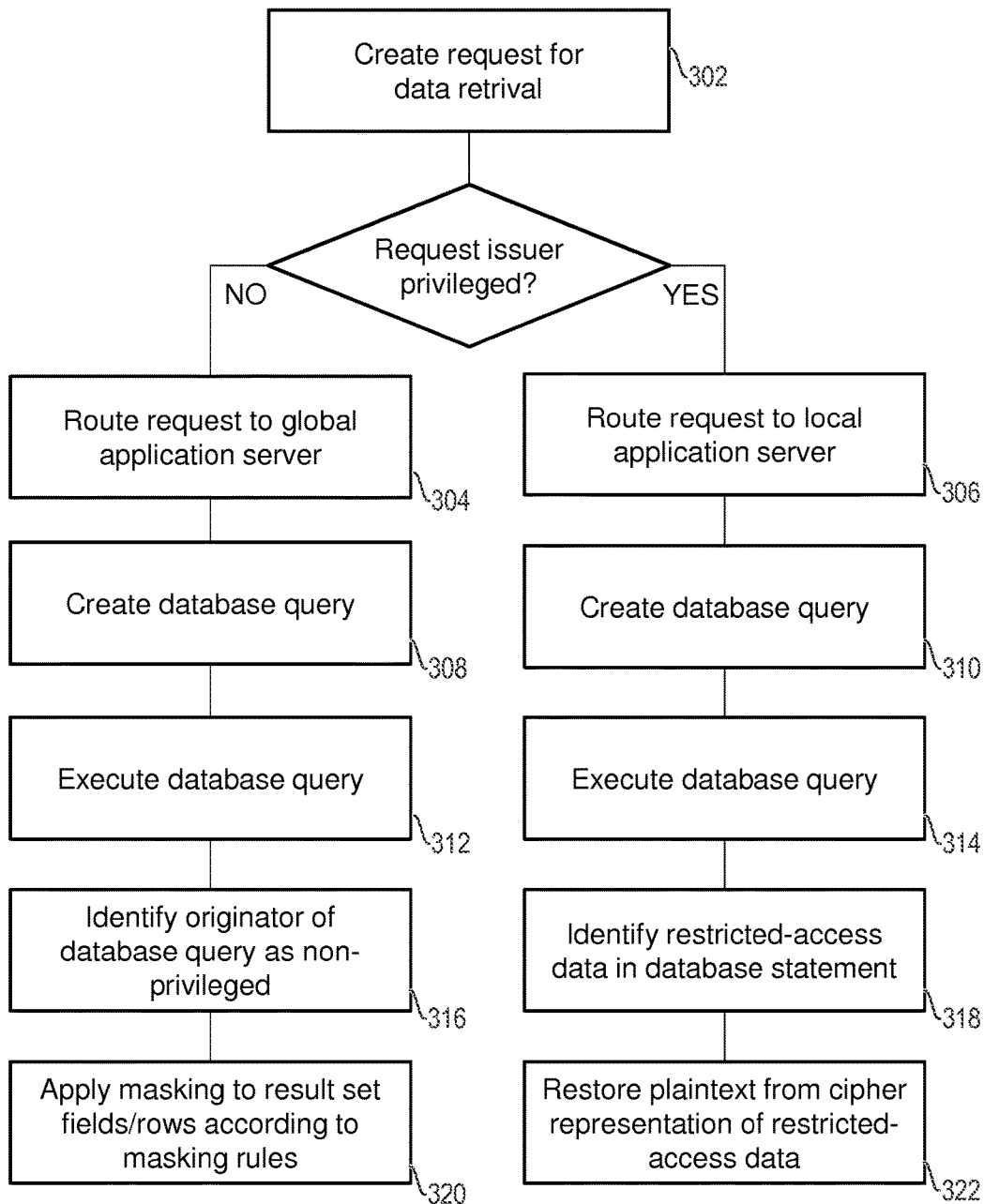
FIG. 3 is a flowchart of an example method for operating the data processing system according to FIG. 1 during retrieval of data containing restricted-access data.
Figure 4:
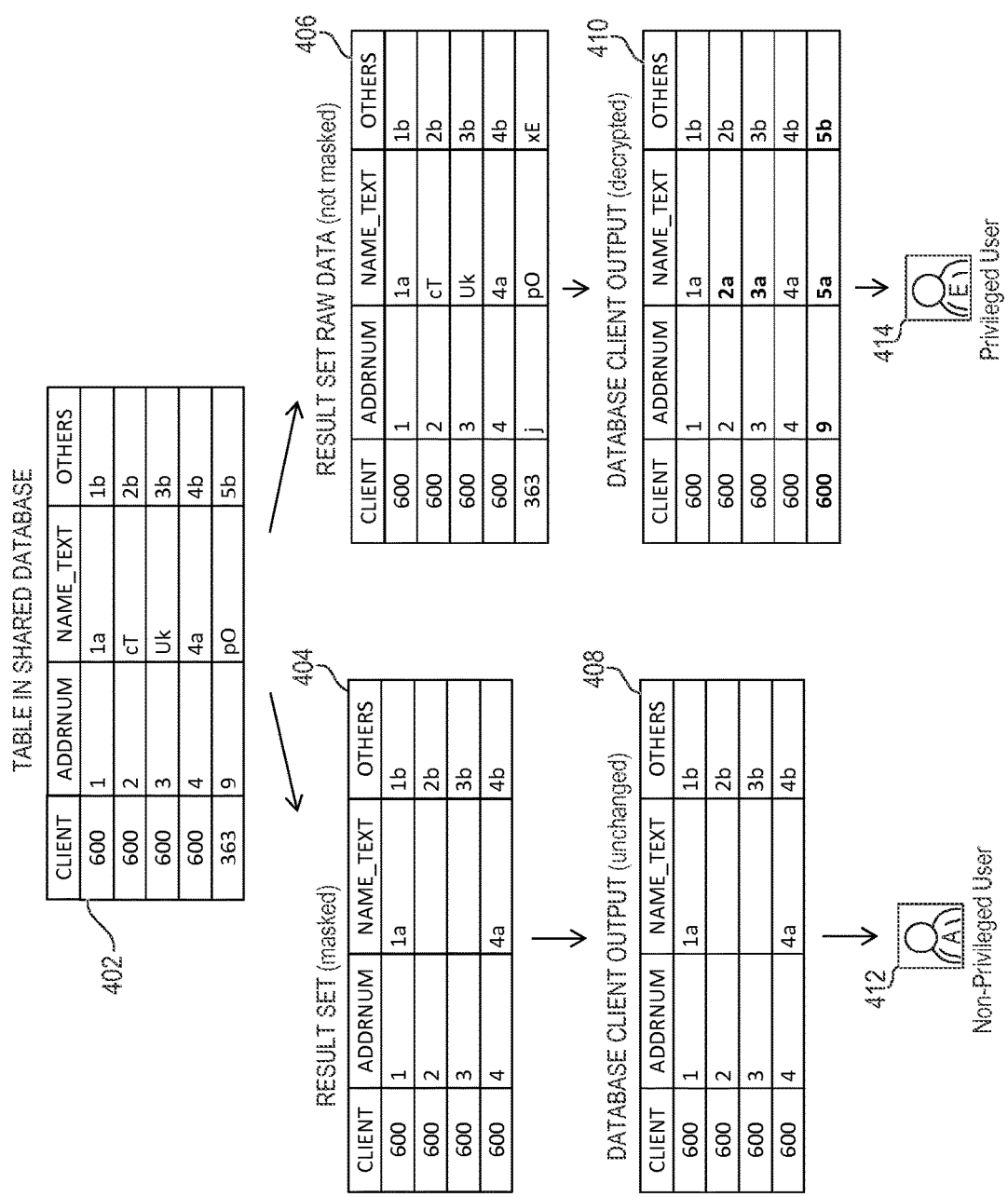
FIG. 4 is a block diagram illustrating the data inventory in the shared database and result sets delivered to database clients of global and local application servers in an example data retrieval operation.

FIGS. 3 and 4 schematically illustrate alternatives of a data retrieval operation. According to FIG. 4, the request may be formed, for example, for retrieval of data from a table 402 in the shared database 114. As before, in a first alternative, the request may originate from a non-privileged user 412. Respective intermediate data aggregates and the resulting database client output are shown on the left hand side. In the second alternative, the request may originate from a privileged user 414. Respective intermediate data aggregates and the resulting database client output are shown on the right hand side.

According to the flow chart provided in FIG. 3 the data retrieval operation may be invoked by a request issued by a user application 108 in the presentation tier 102 in any one of the two alternatives. Again, the request may be routed by the application server manager 124 according to the required privilege in alternative sections 304, 306.

If, according to the first alternative, the application server manager 124 identifies the request to originate from a privileged user, in the example situation, the request will be routed to the local data 122 center in a block306. Then, the retrieval operation will proceed along the right hand branch of the flow chart in FIG. 3. In the local data center 122 the application server 126 may transform the request into a database query in a subsequent block308 as described before. This transformation may be effected in the same way for the local and global data centers 120, 122 as there is no restricted-access information included into or nested with the request. The database query may be sent to the global database 114 afterwards for execution.

In a subsequent block316 the shared database 114 may determine the privilege of the incoming request according to the data center 122 or database client 128 it originates from. If, according to the assumption in the first alternative, the request is determined to be privileged under the privacy regime, the database query will be executed in a conventional manner and the result set will be sent directly to the database client 128. This aspect may be found in the example situation according to FIG. 4. The result set 406 on the right hand side is as expected from a conventional overall selection operation. The result set contains cipher data in the entire last row and in the data fields in the column NAME_TEXT where ADDRNUM=3, 4 as well. These cipher representations may not be used directly by the user application 108.

As a general concept, the cipher representations in the result set 300 will have to be replaced by their respective plaintext before being used to create a response towards the user application 108.

Again and in principal, the functionality for creating the plaintext might be integrated with the database client 128, the application server 126 or even spread across both. In some embodiments, however, the functionality may be entirely incorporated into the database client 128. Accordingly, the database client 128 may be configured to perform a plaintext reconstruction for the cipher representations in the result set received from the database 114. Decryption may be performed by use of the encryption key 130 stored locally in the database client 128. The extent of decryption operation needed may be determined by the database client 128 based on masking rules or masking vectors. In instances, the database client 128 may be configured to perform decryption for those fields in a result set which have a masking rule or a masking vector associated with. In a more specific example, the database client 128 may be configured to retain local copies of masking rules or masking vectors created in preceding data write or insertion operations as described with reference to FIG. 2. Alternatively, masking rules may be provided in the response to the database query by the shared database 114 together with the result set and other well-known execution related data as, for example, error codes.

This aspect may be found in the example situation according to FIG. 4. The database client output 410 on the right hand side has overall field data in plaintext. Plaintext which reconstructed from cipher representations in the raw result set 406 has been written in bold letters for comprehensibility.

If, according to the second alternative, the application server manager 124 identifies the request to require no privilege the request may be routed to any data center (120, 122) in principle. Again, in a typical implementation, routing may be restricted to the global application servers 112 in this situation to keep the local data center 122 clear of unspecific load and data traffic. Accordingly, the operation will proceed along the left branch of the flow chart in FIG. 3 in a block304.

In a subsequent block308 the request may be transformed by an application server 112 in the global data center 120 into a database query. This transformation may be the same as described before with reference to block310. Afterwards, the database query may be sent to the shared database 114 for execution.

In a further block312, the database query will be executed by the shared database 114. As described before, the shared database 114 may determine the privilege of the incoming database query according to the data center 120 or database client 116 it originates from. Accordingly, under the assumptions of the second alternative, the database query will be determined to be without any privilege. Then, the shared database 114 may be configured to perform a combined operation including conventional execution of the query and subsequent masking of the result set.

Conventional execution of a database query should be well-known and will not be explained here. The result set produced by such conventional execution of the database query may contain cipher representations of restricted-access data. Directly forwarding these cipher representations via the conventional database client 116 to the global application server 112 might result in unexpected behavior. The conventional database client 116 does not belong to a privileged section 132 of the data processing system 100 and therefore has no information whether a specific field in the result set contains data in plaintext or cipher representation. The database client 116 therefore might forward the cipher representations where the application server 112 expects plaintext. In similar situations, errors may occur.

To avoid potential problems, the shared database 141 may be configured to apply a masking to the result set in block316 before forwarding it to the database client 116. Preferably, the masking may be performed based on the masking rules or masking vectors received and stored during data insertion as explained before with reference to FIG. 2. In particular, the shared database 114 may perform a look-up in the stored masking vectors for the table and column names and the primary keys in the result set. If the look-up yields a hit, the shared database 114 may replace the cipher representation by a "null" value or another predefined default value. If a predefined default value is used it may be chosen as to provide an indication about the missing information quality of the field data to the downstream data processing instances, namely the application server 112 and the user application 108. This aspect may be found in the example situation according to FIG. 4. The result set 404 supplied by the shared database as shown on the left hand side has empty field values in column NAME_TEXT for ADDRNUM=2, 3.

In some embodiments of a masking strategy, the database 114 may be additionally configured to remove rows from the results set which do not provide any valid information as containing exclusively cipher representations. Implementation of this functionality should be deliberate, however, as having an undesirable impact on row count based operations as, for example, statistical evaluations. This aspect may also be found in the example situation according to FIG. 4. The masked result set 404 does not include a row of entirely masked fields as simple masking might be expected to produce. Instead the masked result set 402 may be restricted to rows containing at least one unmasked data field. This may be advantageous, as fully masked rows may not be used in downstream processing but may result in higher data traffic volume.

At this point, it should be pointed out that masking of the result set is not required to comply with the restrictions under the privacy regime. Even if a global application server 112 would be able to directly access cipher representations of restricted-access data this would not be sufficient for reconstruction of the respective plaintext representations because the cryptographic key will be handled, managed and kept in the local data center only. However and particularly in the situation of format preserving encryption, allowing access to cipher representations could result in unexpected results and should therefore be avoided.

As a principal extension, the shared database 114 may be configured to provide for expected results in typical operations for table structure conversion. As an example thereof, a user in the global data center 120 might wish to add a column to a table containing cipher representations of restricted-access data in the shared database 114 for some reason. A commonly used approach for doing so may be to create a new empty table having the desired layout and to copy the contents of the existing table into the newly created empty table. As described before, the shared database 114 might be configured to treat cipher representations as useless information and to hide these values from the result sets of queries received from the global data center 120. This, in general, would prevent a user in the global data center 120 from (partially) copying a table even when there will be no access to the individual field data during copy operation.

This shortage may be overcome by configuring the shared database 114 for processing queries differently when nested in database statements for data insertion or data creation. In practice, the shared database 114 could be configured to perform any nested query in conventional manner regardless of the privilege of the database client it originates from.

The example data storage and retrieval operations as described before with reference to FIGS. 2, 3 and 4 are "transparent" to the application server 126. Transparent thereby may be understood in the meaning that the encryption and decryption performed by the database client 128 has no influence to the application server 126 interface of the database client 128. The local application server 126 may communicate via this interface in the same way as the global application server 112 communicates to the database client 116.

In conclusion of the examples described before it may be found that restricted-access data created or fed from a privileged section of the data processing system may be stored and/or transported outside the privileged section but will never occur in a plaintext representation there. As the encryption key stored in the database client will never be disseminated outside the local data center there will be no possibility to access the restricted-access data in the cipher representations in the shared database for someone not having the privilege to access the local datacenter.

The example implementations and options as described before may be combined in a way which gives users in the global and local data centers the same functionality to the widest extent and provides full compliance with all restrictions under applicable privacy regimes at the same time. Beyond this, example enhancements have been explained for avoiding unexpected behavior due to the very transparent integration of the data access restrictions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing example embodiment without departing from the scope of the present invention.

What is claimed is:

1. A method for operating a data processing system, said data processing system comprising a plurality of application servers, each application server being individually connected to a shared database by means of a respective database client, said plurality of application servers including a plurality of first application servers, said plurality of first application servers and respective database clients being privileged for processing of restricted-access data under a privacy regime, said method comprising:

receiving a request for data storage by one of said plurality of first application servers, said request comprising restricted-access data under the privacy regime, wherein the privacy regime limits processing of said restricted-access data to a geographical area and;

based on a determination that the one of the plurality of first application servers is within the geographical area, processing the request in said one of the plurality of first application servers thereby extracting said restricted-access data from the request;

encrypting said restricted-access data with a cryptographic key associated with said privacy regime to create a cipher representation, wherein each of the respective database clients manage only one cryptographic key;

defining a masking rule relative to the field designated for storage of the cipher representation in the shared database, the masking rule defining a set of privacy regimes applicable to processing of the restricted-access data included in said field;

forwarding the request, including the cipher representation and the masking rule, to the shared database by the database client associated to said one of said plurality of first application servers; and maintaining information about the cryptographic key in said database client for allowing plaintext reconstruction of restricted-access data from the cipher representation when retrieved from the shared database.

2. The method according to claim 1, further comprising generating said storage request by a user application, said user application being privileged under said privacy regime.

3. The method according to claim 2, further comprising routing said request from said user application to said one of said plurality of first application servers by maintaining the privilege under the privacy regime.

4. The method according claim 1, wherein said plurality of first application servers are privileged for processing of restricted-access data under the privacy regime due to the location of the processing hardware.

5. The method according to claim 1, wherein the extracting said piece of restricted-access data from said storage request and encrypting said extracted piece of restricted-access data are performed by the database client associated to said one of said plurality of first application servers.

6. The method according to claim 1, wherein the defining said masking rules is performed by a database client associated with said one of said plurality of first application servers.

7. The method according to claim 1, wherein encrypting of the restricted-access data is performed by applying a format preserving encryption scheme.

8. The method according to claim 7, further comprising:
receiving by said shared database said cipher representation of said restricted-access data from the database client associated with said one of said plurality of first application servers;
storing the cipher representation in a field in the shared database;
receiving a masking rule associated with the field storing the cipher representation, said masking rule defining a set of privacy regimes being admitted for retrieval of said cipher representation; and
in response to a request for retrieval of data from said field in the shared database, returning the cipher representation if the request is privileged under the privacy regime in accordance with said associated masking rule; otherwise, returning a blank value or a default value.

9. A computer program product for operating a data processing system, the computer program product comprising a computer readable storage medium having program instructions embodied therewith, the program instructions executable by a processor to cause the processor to:
receiving a request for data storage by one of a plurality of first application servers in data processing system, said request comprising restricted-access data, said data processing system comprising a plurality of application servers, each application server being individually connected to a shared database by a respective database client, said plurality of application servers including a plurality of first application servers, said plurality of first application servers and respective database clients being privileged for processing of restricted-access data under a privacy regime, wherein the privacy regime limits processing of said restricted-access data to a geographical area or an organizational unit and;
based on a determination that the one of the plurality of first application servers is within the geographical area, processing the request in said one of the plurality of first application servers thereby extracting said restricted-access data from the request;
encrypting said restricted-access data with a cryptographic key associated with said privacy regime to create a cipher representation, wherein each of the respective database clients manage only one cryptographic key;
defining a masking rule relative to the field designated for storage of the cipher representation in the shared database, the masking rule defining a set of privacy regimes applicable to processing of the restricted-access data included in said field;
forwarding the request, including the cipher representation and the masking rule, to the shared database by the database client associated to said one of said plurality of first application servers; and
maintaining information about the cryptographic key in said database client for allowing plaintext reconstruction of restricted-access data from the cipher representation when retrieved from the shared database.

10. The computer program product according to claim 9, further comprising generating said storage request by a user application, said user application being privileged under said privacy regime.

11. The computer program product according to claim 10, further comprising routing said request from said user application to said one of said plurality of first application servers by maintaining the privilege under the privacy regime.

12. The computer program product according claim 9, wherein said plurality of first application servers are privileged for processing of restricted-access data under the privacy regime due to the location of the processing hardware.

13. The computer program product according claim 9, wherein the extracting said piece of restricted-access data from said storage request and encrypting said extracted piece of restricted-access data are performed by the database client associated to said one of said plurality of first application servers.

14. The computer program product according claim 9, wherein the defining said masking rules is performed by a database client associated with said one of said plurality of first application servers.

15. The computer program product according claim 9, wherein encrypting of the restricted-access data is performed by applying a format preserving encryption scheme.

16. A computer system for operating a data processing system, the system comprising:
a memory; and
a processor, communicatively coupled to said memory, the computer system configured to perform a method comprising:
receiving a request for data storage by one of a plurality of first application servers in data processing system, said request comprising restricted-access data, said data processing system comprising a plurality of application servers, each application server being individually connected to a shared database by a respective database client, said plurality of application servers including a plurality of first application servers, said plurality of first application servers and respective database clients being privileged for processing of restricted-access data under a privacy regime, wherein the privacy regime limits processing of said restricted-access data to a geographical area or an organizational unit and;
based on a determination that the one of the plurality of first application servers is within the geographical area, processing the request in said one of the plurality of first application servers thereby extracting said restricted-access data from the request;

encrypting said restricted-access data with a cryptographic key associated with said privacy regime to create a cipher representation, wherein each of the respective database clients manage only one cryptographic key;

defining a masking rule relative to the field designated for storage of the cipher representation in the shared database, the masking rule defining a set of privacy regimes applicable to processing of the restricted-access data included in said field;

forwarding the request, including the cipher representation and the masking rule, to the shared database by the database client associated to said one of said plurality of first application servers; and maintaining information about the cryptographic key in said database client for allowing plaintext reconstruction of restricted-access data from the cipher representation when retrieved from the shared database.

17. The system according to claim 16, further comprising generating said storage request by a user application, said user application being privileged under said privacy regime.

18. The system according to claim 17, further comprising routing said request from said user application to said one of said plurality of first application servers by maintaining the privilege under the privacy regime.

19. The system according to claim 16, wherein said plurality of first application servers are privileged for processing of restricted-access data under the privacy regime due to the location of the processing hardware.

20. The system according to claim 16, wherein the extracting said piece of restricted-access data from said storage request and encrypting said extracted piece of restricted-access data are performed by the database client associated to said one of said plurality of first application servers.

* * * * *